(12) United States Patent
Riesco et al.

(10) Patent No.: US 8,655,372 B2
(45) Date of Patent: Feb. 18, 2014

(54) DETERMINING POSITIONS IN A WIRELESS RADIO SYSTEM

(75) Inventors: Marcos De Castro Riesco, Madrid (ES); Angel Gallego Vargas, Madrid (ES); Jurgen Galler, Kusnacht (CH)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 12/741,290

(22) PCT Filed: Nov. 4, 2008

(86) PCT No.: PCT/EP2008/064924
§ 371 (c)(1),
(2), (4) Date: Nov. 22, 2011

(87) PCT Pub. No.: WO2009/059964
PCT Pub. Date: May 14, 2009

(65) Prior Publication Data
US 2012/0142366 A1    Jun. 7, 2012

(30) Foreign Application Priority Data

Nov. 5, 2007 (EP) ................................. 07380301

(51) Int. Cl.
*H04W 24/00* (2009.01)
*H04W 4/00* (2009.01)
(52) U.S. Cl.
USPC ........ 455/456.1; 455/41.1; 455/457; 370/338
(58) Field of Classification Search
USPC .............................................. 455/456.1–457
See application file for complete search history.

(56) References Cited

U.S. PATENT DOCUMENTS

| 6,694,142 | B1* | 2/2004 | Kuwahara et al. | 455/456.1 |
| 2004/0203904 | A1* | 10/2004 | Gwon et al. | 455/456.1 |
| 2007/0121560 | A1* | 5/2007 | Edge | 370/338 |

FOREIGN PATENT DOCUMENTS

| WO | 9213284 A | 8/1992 |
| WO | 03071303 A | 8/2003 |
| WO | 03089954 A | 10/2003 |
| WO | 2007056738 A | 5/2007 |
| WO | 2007081356 A | 7/2007 |
| WO | 2007101107 A | 9/2007 |

OTHER PUBLICATIONS

International Search Report and Written Opinion of the International Searching Authority received from PCT Application No. PCT/EP2008/064924, dated Feb. 2, 2009, 20 pages.
Office Action received from European Application No. 07380301.7, dated Feb. 16, 2010, 6 pages.

* cited by examiner

*Primary Examiner* — Lester Kincaid
*Assistant Examiner* — Daniel Lai
(74) *Attorney, Agent, or Firm* — Locke Lord LLP

(57) ABSTRACT

A method is described for expanding the radio-map of a WiFi system. A hotspot ($HS_4$) of which the position is unknown and to be estimated is "seen" in a number of fingerprints ($FP_1$, $FP_2$, $FP_3$), each taken at a different position. Several hotspots with a known position ($HS_1$, $HS_2$ and $HS_3$) are also "seen" in the fingerprints ($FP_1$, $FP_2$, $FP_3$). The geo-positions of the measurement locations, where the fingerprints ($FP_1$, $FP_2$, $FP_3$) were taken, are estimated based on the signals from the hotspots ($HS_1$, $HS_2$, $HS_3$) with known geo-position seen in the fingerprints and the known geo-positions of those hotspots. The position of the hotspot ($HS_4$) is determined based on the signals from that hotspot ($HS_4$) seen in the fingerprints and the geo-positions of the measurement locations where the fingerprints were taken, estimated in the previous step.

20 Claims, 5 Drawing Sheets

LEGEND:

📶 : HOTSPOT $HS_n$ : $HOTSPOT_n$ $FP_m$ : $FINGERPRINT_m$

DISTANCES $HS_1 - FP_1$: R  
$HS_2 - FP_1$: NR  } PROPORTIONAL  
$HS_3 - FP_1$: MR $FP_1$: POINT WHERE THE 3 CIRCUMFERENCES INTERSECT

DETERMINING POSITIONS IN A WIRELESS RADIO SYSTEM

BACKGROUND OF THE INVENTION

1. Technical field

The present invention relates to methods and systems for determining the positions of access points and end-user devices of a wireless radio system. More particularly the present invention relates to methods and systems for determining the positions of access points and end-user devices of WiFi systems, i.e. systems working according to the IEEE 802.11 standard.

2. Description of related art

The availability of Wifi systems has grown considerably over the recent years. Some companies offer tools for performing a worldwide hotspot (access point) search. Based on a street address provided by the user, the tools retrieve from a database of hotspots the nearest hotspot(s) for the user. This database of hotspots is called a radio-map. The user is provided with the name and location of the hotspots, as well as the access type (commercial, free of charge). Radio-maps may be used either online (with an available Internet connection) or offline (without an available Internet connection) by end-user devices equipped with Wifi functionality.

Every day, many new hotspots become available. For this reason, the radio-map should be updated and expanded, regularly. This can be done manually, for example by users, by assigning to each hotspot its position or automatically, by a method known as radio-map war-driving. This latter method consists in driving around in an area to be covered, receiving WiFi signal patterns containing information of the hotspots detected and associating the WiFi signal patterns to the position where they were measured. Typically, the way to determine the measurement position is by using a GPS receiver. When a single hotspot is contained in WiFi signal patterns (also called "fingerprints") taken in different, known positions, enough information is available to calculate the position of such a hotspot.

Radio-map war-driving has some serious drawbacks. First of all, it is not possible to access all places with a motor vehicle, so some hotspots may not be detected by war-driving. Furthermore, war-driving is expensive.

The radio-map is used by WiFi positioning services. Such services use the wireless signals emitted by the access points and the position of the access points in the radio-map to determine the current position of the WiFi enabled (end-user) device. Wifi based positioning of end-users has been described widely in research papers and is being used by companies within different areas such as logistics, health care, visitor guidance, etc. However, frequently the positioning results are not so accurate.

This limited accuracy is caused amongst others by the following error sources:

The signal power emitted by a hotspot is unknown and may be different for each hardware type. The hotspot does not send any information on the emitted signal power on its broadcasting message and therefore, if the received power signal is low, it is not possible to know if is due to a low signal power emitted or just due to a long distance between the measuring device and the hotspot.

Wifi signals go through walls, roofs, etc. and therefore, again, if a low power signal is received, it is not possible to know if this is due to a low emission power or due to a lot of walls between the hotspot and the receptor.

The sensitivity of Wifi enabled devices is very different from one another. Two different devices (a phone and a PDA, for instance) at the same place could very well measure different power signals in spite of being located at the same scenario.

Each device manufacturer may have his own device software driver implementation, so that the received power signal is interpreted in different ways from one device driver to another in spite of being located at the same scenario.

The power of the signals of some of the access points that are used for the positioning is low.

The position of some of the access points that are used for the positioning algorithm is not very accurate.

It is a first object of the invention to provide a method and a system enabling the update and expansion of a radio-map in a cost efficient way.

It is a second object of the invention to provide positioning services with an improved quality and accuracy compared to known techniques.

SUMMARY OF THE INVENTION

The first object of the invention is achieved by a method according to claim 1 and a system according to claim 6. Favourable embodiments are defined by the dependent claims 2-5.

According to a first aspect of the invention a method and system are provided for determining the position of an access point of a wireless radio system. First, signal measurements are retrieved between the access point of which the position is to be determined and a radio device at a plurality of locations. Furthermore, signal measurements are retrieved between a plurality of further access points of the wireless radio system with a known position and the radio device at the plurality of locations. Based on the signal measurements between the access points with known positions and the radio device, the position of the plurality of measurement locations is determined. Based on this position information and on the signal measurements between the access point and the radio device, the position of the access point is determined.

In this way, the radio-map of a wireless radio system can be expanded by including access points with unknown positions or updated by improving the accuracy of the positions of access points with known (low accuracy) positions, without the need of "classical" war-driving (i.e. using measurements of a device including GPS receiver), resulting in a huge cost decrease. Preferably, the radio devices that are used are end-user devices. Since there are many end-user devices and they are also geographically spread, it is very likely that even new access points at remote places will be introduced to the radio-map, quickly. The present invention according to its first aspect is based on the recognition that the signal patterns that these end-user devices detect when scanning for access points, i.e. during their normal operation, may additionally be used for expanding or updating the radio-map of the wireless radio system. So, according to the first aspect of invention there is no need to perform signal measurements only for the purpose of expanding the radio-map. Preferably, the end-user devices periodically transmit their measurement data to a server that performs the position determination of the new access points.

It is of course also possible that the signal measurements between the end-user device and the access points are performed by the access points and not by the end-user devices.

The present invention is preferably used for expanding or updating radio-maps of WiFi systems but it may also be used for expanding or updating radio-maps of other types of wireless radio systems.

The second object of the invention is achieved by a method according to claim 7 and a system according to claim 19. Favourable embodiments are defined by the dependent claims 8-18.

According to a second aspect of the invention a method and system are provided for determining the position of a wireless radio device based on a set of measurements of signals between the wireless radio device and further wireless radio devices located at different, known positions. First, for each of the measurements the position of the corresponding further wireless radio device and a signal measurement is retrieved. Then, non-repeating groups of preferably three (although the groups in principal also may have a larger size) measurements are generated out of the set of measurements. For at least some of the groups, a weight is assigned and the position of the wireless radio device is determined based on the data retrieved for the group. The position of the wireless radio device is preferably determined by trilateration using signal strengths but other position calculation methods may also be used. The steps of determining the weight and determining the position of the wireless radio device may be only performed for the measurement groups wherein the most important measurement is included (i.e. the one with the highest signal strength). The weight of the group may be dependent on the power of the measurement signals of the group and/or the quality of the position of the further wireless radio devices used for the measurements of the group. In case of a low power and low quality of the positions the weight of the measurement group will be low. In case of a high power and high quality of the positions the weight of the measurement group will be high. Finally, the position of the wireless radio device is determined by calculating a weighted average of the positions of the wireless radio device obtained from the data of at least some of the groups.

So, according to the second aspect of the invention, not every measurement group is taken into account equally for the position determination. Measurement groups, which are likely to provide an accurate position, such as the ones with high power measurement signals have a higher impact on the finally determined position of the wireless radio device than those measurement groups that are less likely to provide an accurate position. This results in an improved accuracy of the finally determined position of the wireless radio device.

According to a preferred embodiment, the data of the groups having the lowest weights (for example the 30% lowest weights) is discarded when calculating the weighted average of the position of the wireless radio device. In this way, it is avoided that the weaker groups contaminate the final result.

In case that none of the groups of measurements determines a valid position, the position of the wireless radio device is determined from the weighted average of the positions of the further wireless radio devices. In this way, even in absence of any valid measurements a rough estimation of the position of the wireless radio device may be made.

It should be noted that the method according to the second aspect of the invention is generally applicable to solve the problem of calculating the position of a device/entity observing other emitters whose positions are known and for which a signal power or any other parameter, related to the distance between such emitters and the position of the point of observation, is measured at the observing point.

However, the algorithm is very suitable for determining the position of hotspots to be included in radio-maps and of Wifi enabled (end-user) devices.

In the first case, the set of measurements is preferably performed by one or more end-user devices at different locations. In the second case, the end-user device preferably measures a WiFi signal pattern comprising signals from a plurality of access points with known positions. However, it is also possible that the measurements of the signals between the end-user device and the access points are performed by the access points.

The second object of the invention is furthermore achieved by a method according to claim 20 and a system according to claim 21. It has been found that the trilateration defined in these claims has a higher accuracy than known trilateration methods.

Preferably, the methods according to the first, second and third aspect of invention are implemented by means of a computer program.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Definitions of the Technical Terms that are Used in the Detailed Description:

Wifi enabled device: any device compliant with the 802.11 standard.

Wifi signal pattern (fingerprint): set of data containing information on the hotspots detected when running Wifi scanning Each pattern contains the following information for each of the hotspots detected: MAC address, signal to noise ration, and time stamp. Besides, a Wifi signal pattern can contain or not a GPS position indicating where it was measured. A Wifi signal pattern is also called a fingerprint. Hence, a fingerprint can have a GPS position associated or not.

Wifi positioning method: method which calculates the position of Wifi enabled devices using as inputs the calculated radio-map and the fingerprint measured by the device to be positioned.

Radio-map expansion mechanism: add-on to the positioning algorithm allowing for running Wifi positioning of hotspots in areas where no GPS information is added to the fingerprints collected.

Geo-position: geographical position (latitude, longitude).

Radio-map: collection of hotspots, plus a reference geo-position.

Wifi: originally a brand licensed by the WiFi Alliance to describe the embedded technology of wireless local area networks (WLAN) based on the IEEE 802.11 standard. As of 2007, common use of the term WiFi has broadened to describe the generic wireless interface of mobile computing devices, such as laptops in LANs.

802.11: standard defining WiFi technologies.

Hotspot or Access Point: device that connects wireless communication devices together to form a wireless network.

Self-learning: using any further information which helps to a) improve the existing radio-map so it gets more accurate (by enlarging the number of hotspots included in the radio-map) and b) make it dynamical so it adapts to the changing wireless environment (WiFi points might be relocated, its settings may change, external conditions may affect to the radio propagation conditions, etc.).

First Embodiment of the Invention

Figure 1A:
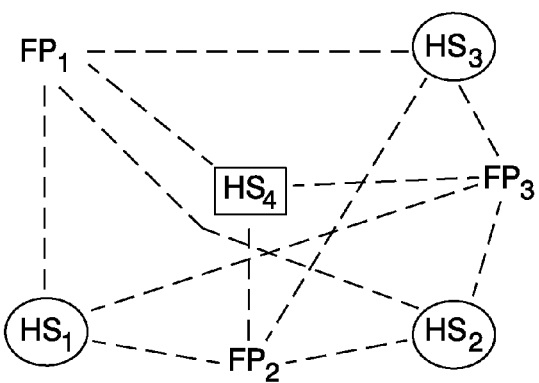
FIGS. 1A, 1B and 1C schematically show the different stages of the radio-map extension method according to a first embodiment of the invention.
Figure 1B:
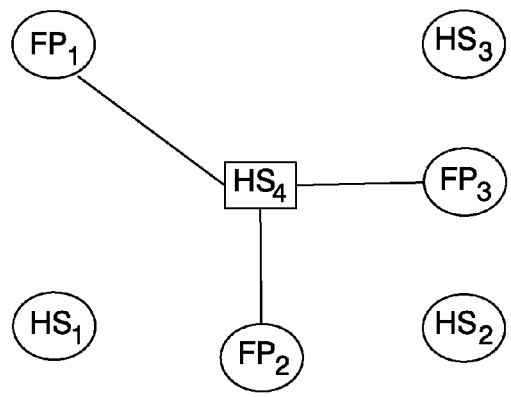
Figure 1C:
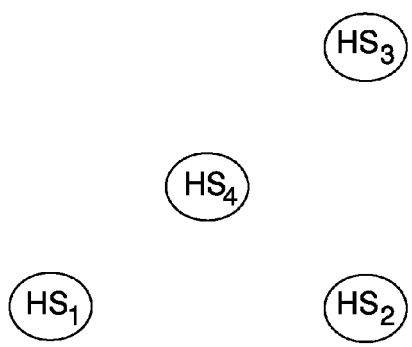

Referring now to FIGS. 1A-1C, a first embodiment of the present invention will be described.

A radio-map is a set of hotspots containing their positions and some unique parameters of them. At any point of time, the radio-map can have 2 categories of hotspots:

1) Those calculated by using fingerprints with geo-positions associated (from war-driving for instance).

2) Those related to fingerprints without any geo-position assigned (orphan hotspots).

Radio-Map Expansion Algorithm

The first embodiment of the present invention relates to a method for expanding the radio-map by estimating and including the position of such orphan hotspots.

The method consists of the following steps:

For every orphan hotspot, select all the fingerprints that have seen the orphan hotspot. This step is schematically shown in FIG. 1A. The hotspot $HS_4$ of which the position is unknown and to be estimated (schematically indicated in the figure by the rectangle around the reference sign) is "seen" in fingerprints $FP_1$, $FP_2$, $FP_3$, each taken at a different position. The geo-positions of the fingerprints are not yet known at this stage. The hotspots $HS_1$, $HS_2$ and $HS_3$ are also "seen" in the fingerprints $FP_1$, $FP_2$, $FP_3$. The geo-positions of those hotspots are known (schematically indicated in the figure by the circle around the reference sign).

Now, the geo-positions of the measurement locations where the fingerprints $FP_1$, $FP_2$, $FP_3$ were taken are estimated. This is done based on the signals from the hotspots $HS_1$, $HS_2$, $HS_3$ with known geo-position seen in the fingerprints and the known geo-positions of the hotspots $HS_1$, $HS_2$, $HS_3$. Thereto, any suitable method may be used, although it is preferred that the trilateration process described herein after in this detailed description is used. This step is schematically shown in FIG. 1B.

Finally, the position of the hotspot $HS_4$ is determined as schematically shown in FIG. 1C. This is done based on the signals from the hotspot $HS_4$ seen in the fingerprints and the geo-positions of the measurement locations where the fingerprints were taken, estimated in the previous step. Again, any suitable method may be used, although it is preferred that the trilateration process described herein after in this detailed description is used.

This flow is iterated until one of these 2 conditions is fulfilled:

There are no more orphan hotspots or

It's not possible to calculate any new geo-position for remaining orphan hotspots to be assigned a position.

The positions of hotspots obtained by means of this radio-map expansion algorithm are also assigned a quality value, typically lower than the quality value that is assigned to hotspots whose position was calculated using war-driving with GPS positioning of the measurement points, where the fingerprints are taken. The radio-map according to the present invention contains information for each hotspot regarding the source of its geo-position (e.g. if it was retrieved by war-driving with GPS or the radio-map expansion method described herein above) and a measurement quality of the position. If new fingerprint input data comes and they allow for calculating again the position of hotspots with a higher quality than the quality of the presently available position of the hotspots, the higher quality position calculated replaced the lower quality one, which allows for improving the radio-map dynamically.

Fingerprint Maintenance

The system according to the present invention will be storing all the fingerprints collected. This allows for the system to improve the radio-map in 2 ways: enlarging the coverage area and enhancing the quality of the geo-positions of the hotspots already contained in the radio-map (self-learning and use of more and more quality fingerprints in order to discard the "worst" or lower quality fingerprints).

Hereby, it is also possible to keep the information in the radio-map updated with all possible changes occurring at the Wifi access point level (change of access point location, change of access point signal strength, etc.).

Furthermore, if a hotspot is detected at several places located too far between them (typical case inducing errors in positioning), this hotspot will be put in "quarantine" and it will not be used in then WiFi positioning method described herein after. When the fingerprints inducing the errors are detected, they are finally discarded and the corresponding hotspot can be hence used by the WiFi positioning method, again (i.e. it is not in quarantine anymore).

The radio map data is used for determining the position of users with Wifi equipped devices. This is provided either in direct communication between those Wifi devices and the servers where the radio map is stored or the radio map is sent to the Wifi devices so that the position calculation (positioning) can be executed directly on the devices.

Second Embodiment of the Invention

Figure 2:
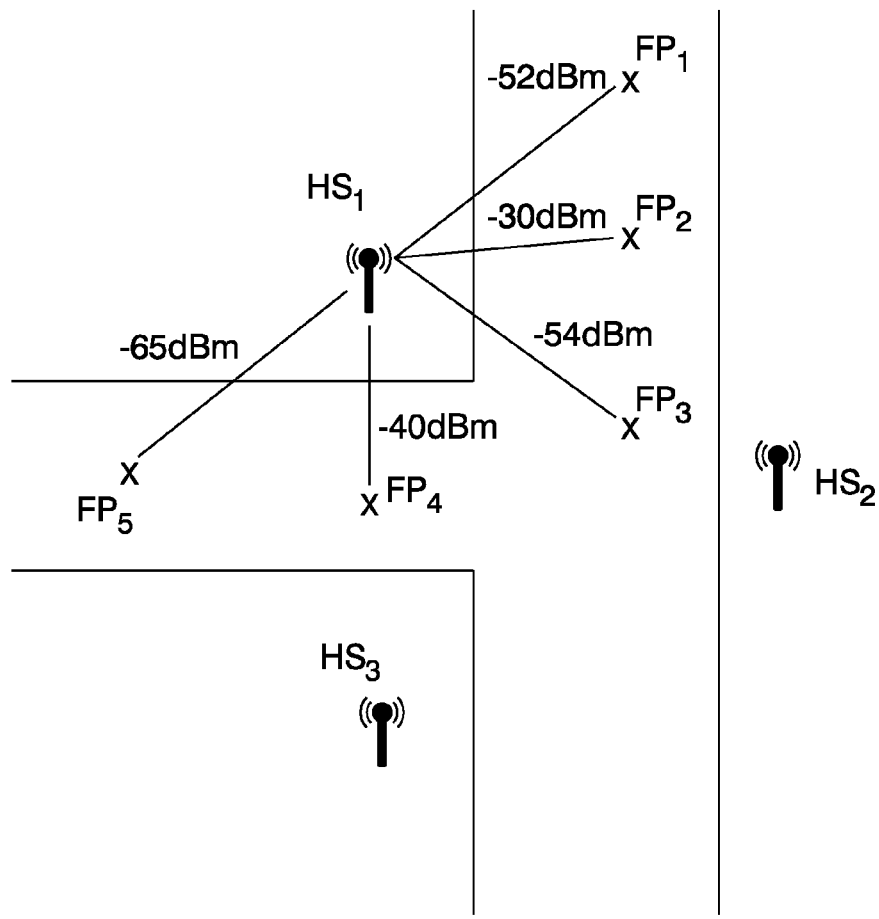
FIG. 2 shows a first example of a position calculation for which the second embodiment of the invention may be used.
Figure 3:
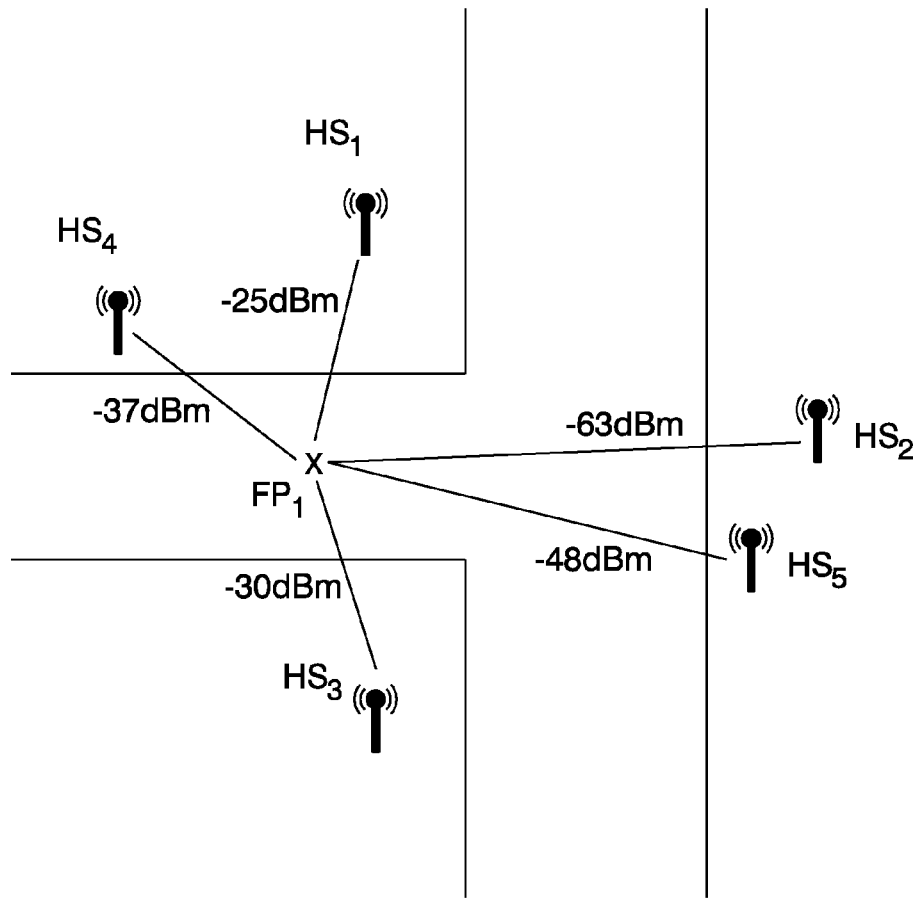
FIG. 3 shows a second example of a position calculation for which the second embodiment of the invention may be used.
Figure 4:
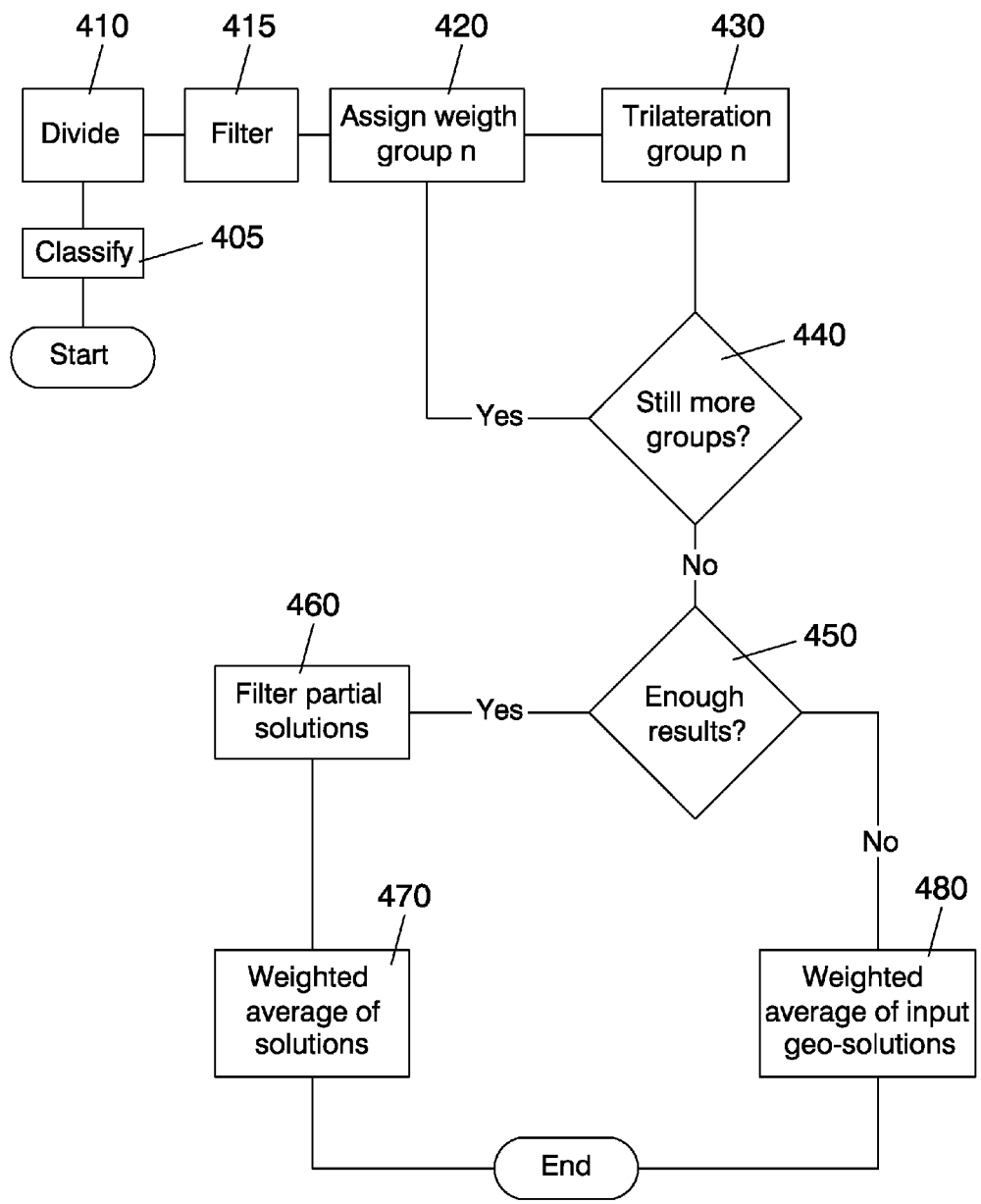
FIG. 4 shows a flowchart of the second embodiment of the present invention.

Referring now to FIGS. 2-4, a second embodiment of the present invention will be described.

The second embodiment relates to a WiFi positioning method with a higher accuracy than known WiFi positioning methods. It can be used for estimating the position of a hotspot that is "seen" on a number of fingerprints taken at different measurement locations with a known geo-position. An example thereof is schematically shown in FIG. 2. Here hotspot $HS_1$ is seen on fingerprints $FP_1$, $FP_2$, $FP_3$, $FP_4$ and $FP_5$ with a signal power of −52 dBm, −30 dBm, −54 dBm, −40 dBm and −65 dBm, respectively. Although, in this example only 5 fingerprints are shown, in practical situations this number may be usually much higher. The signal of the hotspot $HS_1$ seen on each of the fingerprints $FP_1$, $FP_2$, $FP_3$, $FP_4$, $FP_5$ corresponds to one measurement (so in the example of FIG. 2 there are five measurements).

It can also be used for estimating the position of a wireless enabled (end-user) device in case that a number of hotspots with a known location are "seen" on the fingerprint taken by the wireless enabled device. An example thereof is schematically shown in FIG. 3. Here hotspots $HS_1$, $HS_2$, $HS_3$, $HS_4$ and $HS_5$ are seen on $FP_1$ taken by the wireless enabled device with a signal power of −25 dBm, −63 dBm, −30 dBm, −37 dBm and −48 dBm, respectively. The signals of the hotspots $HS_1$, $HS_2$, $HS_3$, $HS_4$, $HS_5$ seen on the fingerprints $FP_1$ each correspond to one measurement (so in the example of FIG. 3 there are five measurements).

The WiFi positioning method comprises five basic steps that will be described with reference to the flowchart shown in FIG. 4.
1. Classification of the available measurements (step 405 in FIG. 4).
2. Dividing the measurements in groups of three (step 410 in FIG. 4).
3. Filtering process (step 420 in FIG. 4).
4. Trilateration (steps 430 and 440 in FIG. 4).
5. Averaging (steps 460 and 470 of FIG. 4).

Classification of the Available Measurements

The first step (step 405 in FIG. 4) is to retrieve the whole set of double-values (geo-position of the associated access point or fingerprint and signal power) of all available measurements. Based on the signal power the available measurements are classified in order to define those contributing with more information to the process. The "importance" of each measurement is defined by its signal strength: the more signal strength measured for the measurement, the more important it is considered for the process (since actually it provides the process with more information).

Dividing the Measurements in Groups of Three

The next step 410 is to produce combinations without repetition of groups of three measurements from all available measurements. This process returns a sample of "groups of three" elements which is going to determine the possible solutions.

Filtering Process

In the next step 415, from this original sample, a set of sorted "sub-samples" is generated by a filtering process. The most important "sub-sample" is the one including all the "groups of three" elements generated by the most important measurement (that with the highest signal strength measured). This is, as well, the largest one. In the example depicted in FIG. 2 the most important measurement is the measurement seen by $FP_2$. So, the most important sub-sample includes the following groups:

($FP_1,FP_2,FP_3$), ($FP_1,FP_2,FP_4$), ($FP_1,FP_2,FP_5$), ($FP_2,FP_3,FP_4$), ($FP_2,FP_3,FP_5$) and ($FP_2,FP_4,FP_5$).

The second most important "sub-sample" is the one including all the "groups of three" elements generated by the second most important measurement (excluding the groups of three involving the most important measurement). In the example depicted in FIG. 2 the second most important measurement is the measurement seen by $FP_4$. So, the second most important sub-sample includes the following groups:

($FP_1,FP_3,FP_4$), ($FP_1,FP_4,FP_5$), ($FP_3,FP_4,FP_5$)

The method proceeds this way until all the sub-samples are obtained (it should be noted that in real life many more measurements are taken than in the examples of FIGS. 2 and 3 and that therefore the number of sub-samples is also much higher).

In the next step 420 a weight is assigned to the groups. The weight is a function of the quality of the power signals of the measurement group. In case that the WiFi positioning method is used for determining the position of a wireless enabled device based on measurements of hotspots having a known position (the situation depicted in FIG. 3) additionally, the quality of the positions of the corresponding hotspots may be taken into account for the weight.

Trilateration Process

The trilateration process (steps 430 and 440) is carried out for all groups of the first sub-sample. In case of obtaining no solution, then the process is applied to the second sub-sample. Again, if no solution is found, the process goes on with the next sub-sample, and so on.

For each group of three elements (measurements), the associated possible solution is calculated by trilateration using their signal strengths. Trilateration is a method of determining the relative positions of objects using the geometry of triangles in a similar fashion as triangulation. Unlike triangulation, which uses angle measurements (together with at least one known distance) to calculate the subject's location, trilateration uses the known locations of two or more reference points, and the measured distance between the subject and each reference point. To accurately and uniquely determine the relative location of a point on a 2D plane using trilateration alone, generally at least three reference points are needed. For this reason, according to the present invention the measurement groups have a size of at least three.

In the Wifi positioning method according to the second embodiment of the invention known trilateration algorithms may be used. However, in order to further improve the accuracy of the position calculations, preferably the trilateration process according to the third embodiment of the invention, described herein after is used.

Averaging

Once all the solutions have been obtained from all measurement groups of the sub-sample(s) if there are enough results (this is checked in step 450), a weighted average will be calculated (step 470) discarding from this average the 30% with lower weight to avoid that the weaker groups contaminate the final result (step 460). This way of positioning the wireless radio device will be denominated as the "more accurate method", because the position is not based on a traditional trilateration but on a method with an improved accuracy in which multiple trilaterations corresponding to multiple measurement groups are performed.

In case that not enough results are available (i.e. there are no multiple groups of measurements) it does not make sense to calculate the weighted average of solutions according to step 460 and 470. In this case, the result will be obtained from the weighted average of the input geo-positions (step 480). This way of positioning the wireless radio device will be denominated as the "less accurate method". In this less accurate method, the "little" information available is taken and an average is calculated. This is illustrated by the following example: In case that there are only three measurements, it is not possible to build multiple groups of 3 measurements (it is only possible to build a single group). In this case it makes no sense to assign weights to the groups since there's only one possible solution. Therefore, the geo-positions of the associated access points or fingerprints are taken and a single trilateration is performed to calculate the position of the device by taking the three geo-positions, calculating the distance between these positions and the device and calculating the position of this latter by taking into account the signal power of each measurement. This signal power can be considered as the weight mentioned with respect to step 480 herein above: in case that the position of a wireless enabled device is determined based on signals received from three hotspots, the more signal power received from a certain hotspot, the more will the position of the device be calculated to be "attracted" to the position of such a hotspot. In another more extreme case only two hotspots are detected. The position of the device will be in the segment whose extremes are the positions of the two detected hotspots and will be closer to the hotspot detected with higher signal power. In case that only one hotspot is detected, the position calculated for the device will be the position of the detected hotspot, because the weight for this position is 1.

The geo-position calculated is assigned a quality value. This quality value is obtained as a function of both a) the weight of the groups used, and b) the algorithm selected (weighted average from solutions—"more accurate method"—or from input geo-positions—"less accurate method"—). Furthermore, the position resulting is assigned an error range/accuracy. In case that the position of an access point is determined, the quality value and accuracy data will be included in the radio-map together with the determined position of the access point.

Third Embodiment of the Invention

Figure 5:
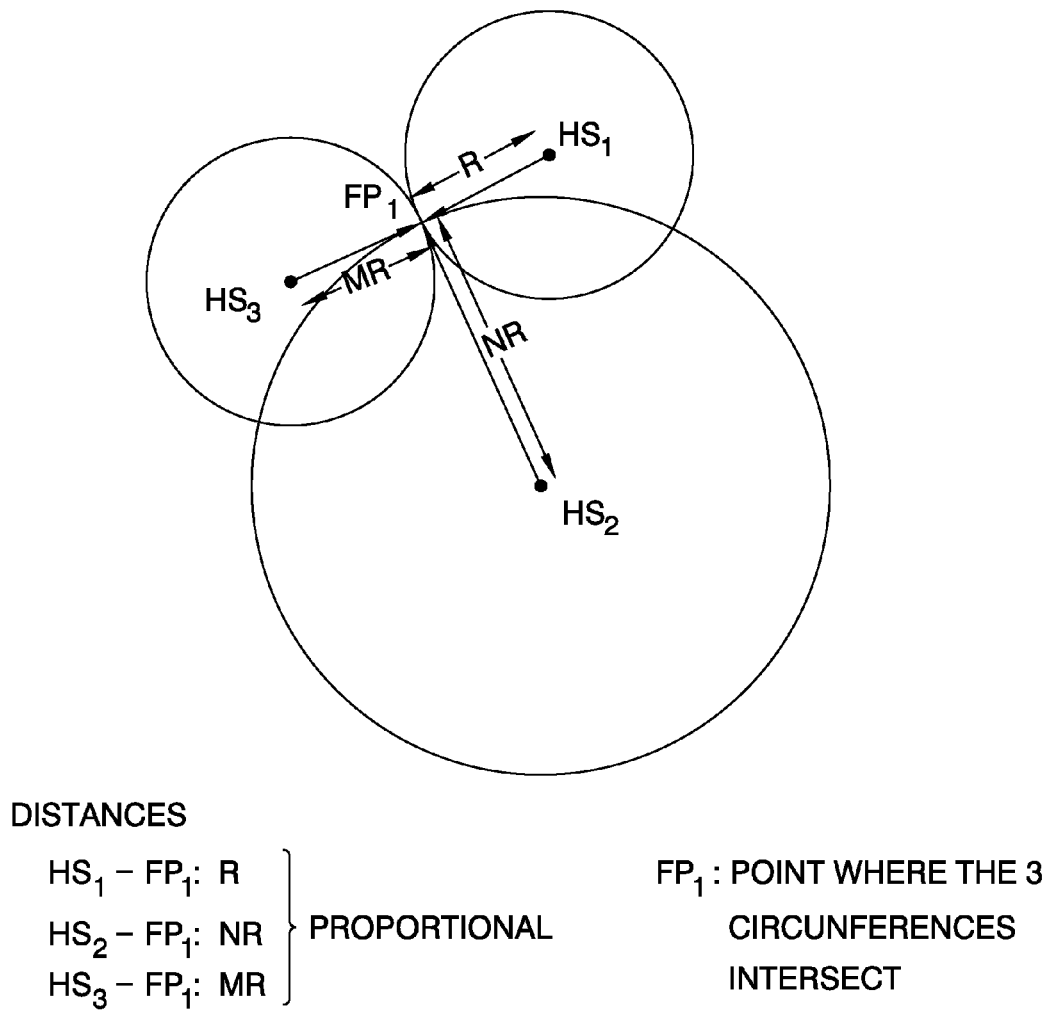
FIG. 5 shows the trilateration method according to the third embodiment of the invention.

Referring now to FIG. 5, a third embodiment of the present invention will be described.

The third embodiment relates to a trilateration process. As discussed herein above, trilateration is a method of determining the relative positions of objects using the geometry of triangles in a similar fashion as triangulation. Unlike triangulation, which uses angle measurements (together with at least one known distance) to calculate the subject's location, trilateration uses the known locations of two or more reference points, and the measured distance between the subject and each reference point. To accurately and uniquely determine the relative location of a point on a 2D plane using trilateration alone, generally at least 3 reference points are needed.

The trilateration in FIG. 5 is shown for the case that the position of a wireless enabled device is determined based on three detected hotspots $HS_1$, $HS_2$, $HS_3$ in a fingerprint $FP_1$. However, the trilateration according to the third embodiment of the invention can also be applied for the inverse case, for determining the position of a hotspot based on its signal detected in three different fingerprints.

The trilateration process consists in solving a system of equations formed by 3 circumferences where:

The circumferences centres are given by the hotspot position in meters respect to the polar and equatorial axes. This is calculated by means of the algorithm "geocoords2meters" (see appendix).

For calculating the circumferences radius, it is required to convert the signal powers of the hotspots into distances. Such conversion is carried out by means of the algorithm "pow2dist" (see appendix).

The process is as follows:

a. The radius of the circumference defined by the first hotspot is the value to be obtained in the system, R.

b. The radius of the other 2 circumferences are proportional to the first one according to a proportionality ratio/factor equal to distance of the hotspot (obtained by "pow2dist") divided by the distance of the first hotspot, as specified by the following table:

| HotSpot | Signal power | Distance | Distance for trilateration |
|---|---|---|---|
| 1 | P1 | D1 = pow2Dist(P1) | Value to be obtained R |
| 2 | P2 | D2 = pow2Dist(P2) | D2/D1 * R = N * R |
| 3 | P3 | D3 = pow2Dist(P3) | D3/D1 * R = M * R |

Thus, a system of 3 squared equations with 3 values to be obtained is reached: the coordinates (in meters) respect to the polar and equatorial axes of the intersection and the value of the radius of the first circumference (and hence of the others since N, M are known) for which the intersection exists.

Since it's a system of 3 squared equations and 3 values to be obtained, in many cases there will be 2 possible solutions for the position of $FP_1$. In this case, it is required to define criteria to choose the best one. We define an error function and the criterion is to choose the solution with lowest error. The error function is defined as the average square error when comparing the real distances between the solution in hand and the hotspots included in the group of three element, calculated with the algorithm "coords2distance" with the theoretical distance calculated with "pow2distance":

For each possible mathematical solution $S_j$, where j=1,2, its error function is calculated as follows:

| HotSpot | Signal power | Theoretical distance | Distance in meters with solution |
|---|---|---|---|
| H1 | P1 | D1 = pow2Dist(P1) | d1, j = coords2dist($S_j$, H1), j = 1, 2 |
| H2 | P2 | D2 = pow2Dist(P2) | d2, j = coords2dist($S_j$, H2), j = 1, 2 |
| H3 | P3 | D3 = pow2Dist(P3) | d3, j = coords2dist($S_j$, H3), j = 1, 2 |

Error vector function of the vector of solutions $S=(S_1, S_2)$:

$$E(S) = \sqrt{\sum_{i=1}^{3} (Di - di)^2}$$

Figure 6:
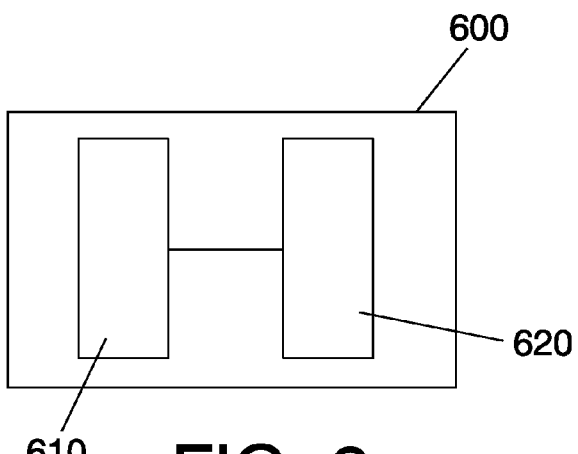
FIG. 6 shows a general purpose computer system that may be used for implementing the invention.

The methods according to the three embodiments of the present invention are particularly suited to be carried out by a computer software program, such computer software program preferably containing modules corresponding to the individual steps of the methods. Such a computer program can of course be embodied in a computer-readable medium, such as an integrated chip, a peripheral device or memory. FIG. 6 illustrates a computer system 600 comprising such a memory 620 coupled to a processor 610. This processor is preferably a general purpose processor and executes the instructions of the computer program stored in the memory 620.

As will be recognized by those skilled in the art, the innovative concepts described in the present application can be modified and varied over a wide range of applications.

Accordingly, the scope of patented subject matter should not be limited to any of the specific exemplary teachings discussed, but is instead defined by the following claims. Any reference signs in the claims shall not be construed as limiting the scope thereof.

Appendix: Specific Algorithms Referred to in the Detailed Description

Pow2Distance Algorithm
Inputs: power=signal power received
Outputs: res_=distance in meters
   Coef=3.373
   Landa=−32
res_=10^((Coef−power)/(10*landa))
were Coef and Landa are constants from the model.

Coords2Dist Algorithm
Inputs: (long1, lat1), (long2, lat2)=geo-coordinates of the points
Outputs: res_=distance between the 2 points in meters
   Const radioPolar As Double=6356' kilometers
   Const radioEcuatiorial As Double=6378' kilometers
   latRad1=lat1*pi/180
   latRad2=lat2*pi/180
   longRad1=long1*pi/180
   longRad2=long2*pi/180
x1=latRad1*radioPolar
y1=longRad1*radioEcuatiorial
x2=latRad2*radioPolar
y2=longRad2*radioEcuatiorial
res_=((x1−x2)^2+(y1−y2)^2)^(½)

geocords2Meters algorithm
Inputs: (long1_deg, lat1_deg)=geo-coordinates
Outputs: (x1,y1)=distance to axis in meters
Const radioPolar As Double=6356' kilometers
Const radioEcuatiorial As Double=6378' kilometers
x1=long1_deg/180*pi*radioEcuatiorial
y1=lat1_deg/180*pi*radioPolar

The invention claimed is:

1. Method for determining by trilateration position of an access point of a wireless radio system comprising the following steps:
retrieving signal measurements between the access point (HS4) of which the position is to be determined and a radio device at a plurality of locations (FP1, FP2, FP3) and signal measurements between a plurality of further access points (HS1, HS2, HS3) with a known position and the radio device at the plurality of locations;
determining the position of the plurality of locations based on the signal measurements between the further access points and the radio device; and
determining the position of the access point based on the signal measurements between the access point and the radio device and based on the position of the locations by solving a system of equations formed by three circumferences wherein,
a) the circumference centres correspond to the three locations;
b) the circumference radii correspond to the distances, wherein a proportionality factor (N,M) of at least some of the distances with respect to another of the distances is used as an input to the system of equations.

2. Method according to claim 1 wherein the radio device is an end-user device of the wireless radio system.

3. Method according to claim 1 or 2 wherein the signals between the access point and the radio device and the signals between the plurality of further access points and the radio device are measured by the radio device.

4. Method according to claim 1 or 2 wherein the signals between the access point and the radio device are measured by the access point and the signals between the plurality of further access points and the radio device are measured by the further access points.

5. Method according to claim 1, used for extending a radiomap of the wireless radio system.

6. Method according to claim 1, wherein the wireless radio system is a WiFi system.

7. A computer program product comprising computer program code means stored on a computer readable, non-transitory medium, adapted to perform the steps of claim 1, when said program is run on a computer.

8. Method for determining by trilateration position of a wireless radio device based on a set of measurements of signals between the wireless radio device and further wireless radio devices located at different, known positions, the method comprising the following steps:
a) retrieving (405) for each of the measurements the position of the corresponding further wireless radio device and a signal measurement;
b) generating (410) non-repeating groups of measurements out of the set of measurements;
c) for at least some of the groups:
c1) assigning (420) a weight to the group and
c2) determining (430) the position of the wireless radio device based on the data retrieved for the group;
d) determining (470) the position of the wireless radio device by calculating a weighted average of the positions of the wireless radio device obtained from the data of at least some of the groups by solving a system of equations formed by three circumferences wherein,
d1) the circumference centres correspond to three locations;
d2) the circumference radii correspond to the distances, wherein a proportionality factor (N,M) of at least some of the distances with respect to another of the distances is used as an input to the system of equations.

9. Method according to claim 8 wherein the position of the wireless radio device is determined by trilateration using signal strengths.

10. Method according to claim 8 or 9 wherein each group consists of three measurements.

11. Method according to claim 8, wherein the steps of assigning a weight and determining the position of wireless radio device are performed for all groups in which the most important measurement is included.

12. Method according to claim 8, wherein the weight of the group is a function of the strength of the signals used for the measurements of the group.

13. Method according to claim 8, wherein the weight of the group is a function of the quality of the position of the further wireless radio devices used for the measurements of the group.

14. Method according to claim 8, wherein the data of the groups having the lowest weights is discarded when calculating the weighted average of the position of the wireless radio device.

15. Method according to claim 8, wherein the wireless radio device is an access point.

16. Method according to claim 15 wherein for the measurements one or more end-user devices at different positions are used.

17. Method according to claim 8, wherein the wireless radio device is an end-user device.

18. Method according to claim 17 wherein for each of the measurements a different access point is used as the further wireless radio device.

19. Method according to claim 8, wherein if none of the groups of measurements determines a valid position, the position of the wireless radio device is determined from the weighted average of the positions of the further wireless radio devices.

20. Trilateration method for determining position of a wireless radio device comprising the steps of:
retrieving signal measurements between the wireless radio device (HS1) of which the position is to be determined and a further radio device at at least three locations (FP1, FP2, FP3),
converting the signal measurements into distances between the wireless radio device and the three locations,
determining the position of the wireless radio device by solving a system of equations formed by three circumferences wherein,
a) the circumference centres correspond to the three locations;
b) the circumference radii correspond to the distances, wherein a proportionality factor (N,M) of at least some of the distances with respect to another of the distances is used as an input to the system of equations.

* * * * *